US008566332B2

(12) United States Patent
Huberman et al.

(10) Patent No.: US 8,566,332 B2
(45) Date of Patent: Oct. 22, 2013

(54) POPULATING VARIABLE CONTENT SLOTS ON WEB PAGES

(75) Inventors: Bernardo Huberman, Palo Alto, CA (US); Fang Wu, Palo Alto, CA (US)

(73) Assignee: Hewlett-Packard Development Company, L.P.

( * ) Notice: Subject to any disclaimer, the term of this patent is extended or adjusted under 35 U.S.C. 154(b) by 918 days.

(21) Appl. No.: 12/396,430

(22) Filed: Mar. 2, 2009

(65) Prior Publication Data

US 2010/0223578 A1 Sep. 2, 2010

(51) Int. Cl.
*G06F 7/00* (2006.01)
*G06F 17/30* (2006.01)

(52) U.S. Cl.
USPC .......................................... 707/751; 707/805

(58) Field of Classification Search
USPC .......................... 707/750–751; 715/810–811
See application file for complete search history.

(56) References Cited

U.S. PATENT DOCUMENTS

| | | | | |
|---|---|---|---|---|
| 6,163,758 | A * | 12/2000 | Sullivan et al. | 702/66 |
| 6,564,217 | B2 * | 5/2003 | Bunney et al. | 1/1 |
| 6,681,247 | B1 * | 1/2004 | Payton | 709/217 |
| 6,721,744 | B1 * | 4/2004 | Naimark et al. | 1/1 |
| 6,907,576 | B2 * | 6/2005 | Barbanson et al. | 715/791 |
| 7,047,294 | B2 * | 5/2006 | Johnson et al. | 709/224 |
| 7,162,473 | B2 * | 1/2007 | Dumais et al. | 1/1 |
| 7,373,599 | B2 | 5/2008 | McElfresh | |
| 7,373,606 | B2 * | 5/2008 | Gorzela | 715/738 |
| 7,451,194 | B2 * | 11/2008 | Bowser et al. | 709/219 |
| 7,660,822 | B1 * | 2/2010 | Pfleger | 707/999.107 |
| 7,734,632 | B2 * | 6/2010 | Wang | 707/749 |
| 7,779,001 | B2 * | 8/2010 | Zeng et al. | 707/726 |
| 7,797,421 | B1 * | 9/2010 | Scofield et al. | 709/224 |
| 7,805,429 | B2 * | 9/2010 | Abrams et al. | 707/706 |
| 7,818,194 | B2 * | 10/2010 | Yoshida et al. | 705/7.32 |
| 7,921,107 | B2 * | 4/2011 | Chang et al. | 707/723 |
| 7,966,395 | B1 * | 6/2011 | Pope et al. | 709/224 |
| 2002/0032696 | A1 * | 3/2002 | Takiguchi et al. | 707/500.1 |
| 2002/0147834 | A1 * | 10/2002 | Liou et al. | 709/236 |
| 2003/0149938 | A1 * | 8/2003 | McElfresh et al. | 715/517 |
| 2003/0167195 | A1 * | 9/2003 | Fernandes et al. | 705/8 |
| 2004/0236721 | A1 * | 11/2004 | Pollack et al. | 707/2 |
| 2004/0267700 | A1 * | 12/2004 | Dumais et al. | 707/2 |
| 2005/0114324 | A1 * | 5/2005 | Mayer | 707/3 |
| 2005/0257156 | A1 * | 11/2005 | Jeske et al. | 715/745 |
| 2006/0004799 | A1 * | 1/2006 | Wallender | 707/100 |
| 2007/0005297 | A1 * | 1/2007 | Beresniewicz et al. | 702/181 |
| 2007/0208583 | A1 * | 9/2007 | Ward | 705/1 |
| 2008/0082381 | A1 * | 4/2008 | Muller et al. | 705/7 |
| 2008/0097988 | A1 * | 4/2008 | Broder et al. | 707/5 |

(Continued)

OTHER PUBLICATIONS

Ju et al., Improvement of Page Ranking Algorithm Based on Timestamp and Link, May 2008, IEEE Computer Society, pp. 36-40.*

(Continued)

*Primary Examiner* — Wilson Lee
*Assistant Examiner* — Jessica N Le

(57) ABSTRACT

A respective novelty value is ascertained for each of multiple user-selectable contents. Each of the novelty values represents a level of newness of the respective user-selectable content in relation to the other user-selectable contents. A respective novelty decay value is calculated for each of the user-selectable contents as a decreasing function of the respective novelty value. A prioritization order of the user-selectable contents in respective prioritized positions on a web page is determined based on the novelty decay values.

20 Claims, 6 Drawing Sheets

(56) References Cited

U.S. PATENT DOCUMENTS

| | | | | |
|---|---|---|---|---|
| 2008/0189334 | A1* | 8/2008 | Mathur | 707/104.1 |
| 2008/0249842 | A1* | 10/2008 | Lee et al. | 705/10 |
| 2008/0256002 | A1* | 10/2008 | Yoshida et al. | 705/500 |
| 2008/0281610 | A1* | 11/2008 | Yoshida et al. | 705/1 |
| 2008/0306824 | A1* | 12/2008 | Parkinson | 705/14 |
| 2009/0063377 | A1* | 3/2009 | Brady et al. | 706/20 |
| 2009/0094092 | A1* | 4/2009 | Hengel | 705/10 |
| 2009/0119173 | A1* | 5/2009 | Parsons et al. | 705/14 |
| 2009/0150379 | A1* | 6/2009 | Park et al. | 707/5 |
| 2009/0198774 | A1* | 8/2009 | Naimark et al. | 709/204 |
| 2010/0100845 | A1* | 4/2010 | Khan et al. | 715/810 |
| 2010/0131384 | A1* | 5/2010 | Chen et al. | 705/26 |
| 2010/0145918 | A1* | 6/2010 | Stata et al. | 707/696 |
| 2010/0191741 | A1* | 7/2010 | Stefik et al. | 707/748 |
| 2011/0040751 | A1* | 2/2011 | Chandrasekar et al. | 707/725 |
| 2011/0161331 | A1* | 6/2011 | Chung et al. | 707/751 |
| 2011/0314477 | A1* | 12/2011 | Zhong | 718/103 |
| 2012/0030016 | A1* | 2/2012 | Arnold | 705/14.49 |

OTHER PUBLICATIONS

Fang Wu and Bernardo A. Huberman, “Novelty and Collective Attention,” Proc. Natl. Acad. Sci. (USA), vol. 105, 17599 (2007).

Bernardo A. Huberman and Fang Wu, “The Economics of Attention: Maximizing User Value in Information-Rich Environments,” Advances in Complex Systems, vol. 11, No. 4 (2008) 487-496.

* cited by examiner

POPULATING VARIABLE CONTENT SLOTS ON WEB PAGES

BACKGROUND OF THE INVENTION

FIG. 1 shows an exemplary embodiment of a web page 10 that includes a header section 12, a navigation bar 14, a topics section 16, a contents section 18, an advertisements section 20, notices 22, and navigation links 24. The header section 12 includes a logo 26 and a login section 28 that allows users to sign into their account with a web server that is serving the web page 10. The navigation bar 14 typically contains links (e.g., hypertext links) to other pages of a web site that includes the web page 10. The topics section 16 includes a set of topic slots designated for receiving respective topic-based objects. The contents section 18 includes a set of content slots for receiving respective content-based objects. The advertisements section 20 includes a set of ad slots for receiving respective advertisement-based objects. The notices 22 include various legal (e.g., copyright) and other notices that the web site owner wishes to convey to users of the web site. The navigation links 24 include links to specific pages that are associated with the web site, including links to a search page, a link to a page that describes the terms and conditions relating to the use of the web site, a link to a page that provides a map of the web site, and a link to a help page.

The slots in any of the topics section 16, the contents section 18, and the advertisements section 20 may be filled with different user-selectable objects over time. For example, the slots of the topics section 16 may be populated with various topical user-selectable contents that relate to different topics (e.g., entertainment, politics, finance, nature); the slots of the contents section 20 may be filled with various content-based objects (e.g., stories, articles, and other information available on the World Wide Web); and the slots of the advertisements section 20 may be filled with various advertisements. Although a variety of different methods made by used to populate the variable content sections of the web page 10 with different user-selectable contents over time, both the owner and the users of the web site typically benefit by prioritizing these user-selectable contents in a way that increases the number of times the contents are selected (or clicked on) by the users: the owner typically benefits by increasing the revenues and the popularity of the web site; and the users benefit by being able to quickly access information that is most likely to be relevant to the users' interests.

For this reason, content providers vie for users' limited attention by resorting to a number of strategies aimed at maximizing the number of clicks devoted to their web sites. These strategies range from data personalization and short videos to the dynamic rearrangement of items in a given page, to name a few. In all these cases, the ultimate goal is the same: to draw the attention of the visitor to a website before she proceeds to the next one. A variety of different factors, such as the location and size of the user-selectable content on a web page, affect the amount of attention that a particular user-selectable content will receive. For example, user-selectable contents appearing at the top of a web page typically will generate more page clicks than user-selectable contents appearing at the bottom of the web page. The goal for many content providers is to optimize these factors so as to maximize the number of clicks on the web page. Most solutions to the problem of website relevance are based on either page rank (like the Google algorithm) or heuristics used by the editors of the page. Neither of these strategies, however, can guarantee a maximum number of clicks per interval of time.

What are needed are improved systems and methods of populating variable content slots on a web page.

BRIEF SUMMARY OF THE INVENTION

In one aspect, the invention features a method in accordance with which a respective novelty value is ascertained for each of multiple user-selectable contents. Each of the novelty values represents a level of newness of the respective user-selectable content in relation to the other user-selectable contents. A respective novelty decay value is calculated for each of the user-selectable contents as a decreasing function of the respective novelty value. A prioritization order of the user-selectable contents in respective prioritized positions on a web page is determined based on the novelty decay values.

The invention also features apparatus operable to implement the inventive methods described above and computer-readable media storing computer-readable instructions causing a computer to implement the inventive methods described above.

Other features and advantages of the invention will become apparent from the following description, including the drawings and the claims.

DETAILED DESCRIPTION OF THE INVENTION

Figure 1:
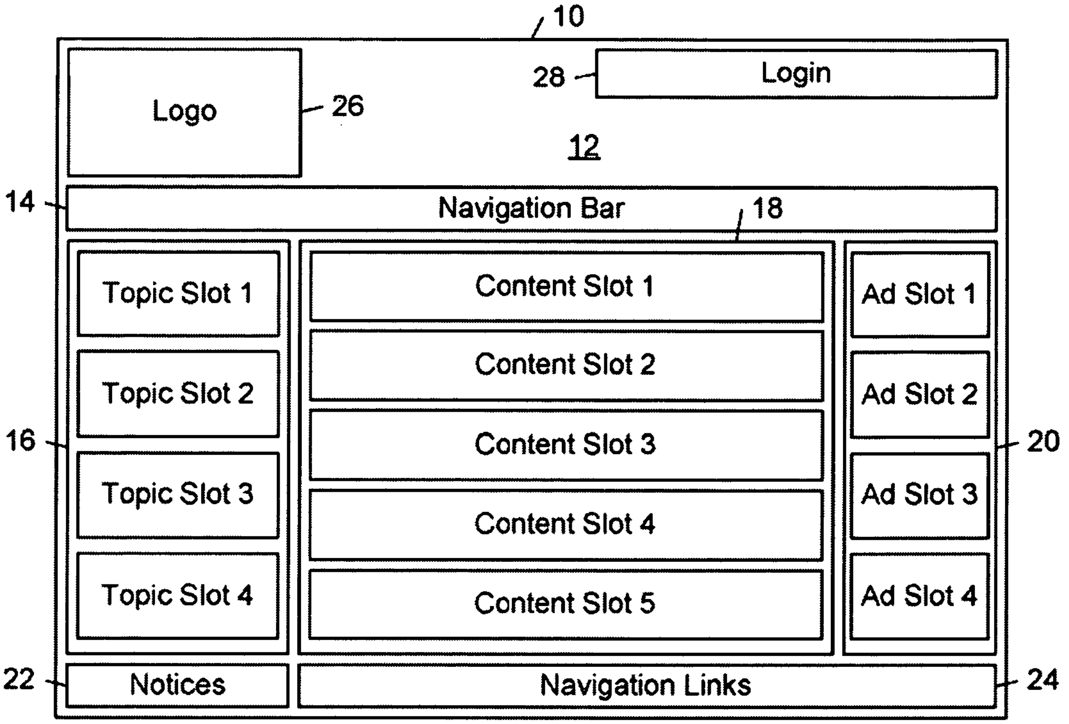
FIG. 1 (Prior Art)
FIG. 1 is a block diagram of an exemplary a web page.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

The term "user-selectable content" refers broadly to any visually perceptible element (e.g., images and text) of a web page that is associated with a respective interface object (e.g., a link to a network resource or other control that is detectable by a web server) that is responsive to a user's execution command (e.g., click) with respect to the user-selectable content. The term "click" refers to the act or operation of entering or inputting an execution command (e.g., clicking the left computer mouse button).

A "link" refers to an object (e.g., a piece of text, an image or an area of an image) that loads a hypertext link reference into a target window when selected. A link typically includes an identifier or connection handle (e.g., a uniform resource identifier (URI)) that can be used to establish a network connection with a communicant, resource, or service on a network node.

As used herein, the term "web page" refers to any type of resource of information (e.g., a document, such as an HTML or XHTML document) that is suitable for the World Wide Web and can be accessed through a web browser. A web page typically contains information, graphics, and hyperlinks to other web pages and files. A "web site" includes one or more web pages that are made available through what appears to users as a single web server.

A "slot" refers to a position on a web page that contains user-selectable content that can be changed dynamically (e.g., each time the web page is refreshed).

A "computer" is a machine that processes data according to machine-readable instructions (e.g., software) that are stored on a machine-readable medium either temporarily or permanently. A set of such instructions that performs a particular task is referred to as a program or software program. A "server" is a host computer on a network that responds to requests for information or service. A "client" is a computer on a network that requests information or service from a server.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CDROM/RAM.

A "network node" is a junction or connection point in a communications network. Exemplary network nodes include, but not limited to, a terminal, a computer, and a network switch. A "network connection" is a communication channel between two communicating network nodes.

A "resource" is network data object or service that can be identified by a link. A resource may have multiple representations (e.g., multiple languages, data formats, size, and resolutions).

A "predicate" is a conditional part of a rule. An "access control predicate" is a predicate that conditions access (typically to a resource) on satisfaction of one or more criteria.

As used herein, the term "includes" means includes but not limited to, the term "including" means including but not limited to. The term "based on" means based at least in part on.

II. Introduction

The embodiments that are described herein provide methods and apparatus for populating variable content slots on web pages with user-selectable contents (e.g., advertisements, topic files, and other variable contents) in a way that increases the attention that is drawn to the web page. These embodiments provide a principled way of prioritizing user-selectable contents when designing dynamic websites. In some embodiments, the rates with which novelty and popularity evolve within the website are translated into a prioritization ordering of the user-selectable contents. Some embodiments, are designed to guarantee a maximal level of attention (e.g., a maximum number of clicks per interval of time) when deciding between strategies (or procedures) for ordering user-selectable contents on a web page.

III. Overview

Figure 2:
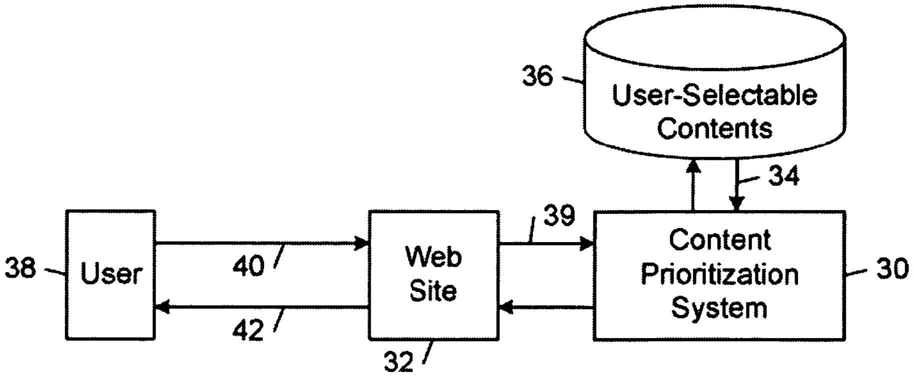
FIG. 2 is a block diagram of a system for arranging user-selectable contents on one or more pages of a web site.

FIG. 2 shows a block diagram of an embodiment of a content: prioritization system 30 that populates variable content slots on one or more web pages of a web site 32 with user-selectable contents 34 that are selected from a database 36.

The web site 32 typically is hosted by a web server. In some embodiments, the content prioritization system 30 is implemented on the web server that hosts the web site 34. In other embodiments, the content prioritization system 30 is implemented on another server that responds to requests from the web server for a prioritized ordering of the selected ones of the user-selectable contents 34 on the one or more pages of the web site 34. In these embodiments, the user-selectable contents 34 may be selected by the web server, the content prioritization system 30, or another server (e.g., an advertisement server).

A user 38 interacts with the web site 34 by sending a request 40 to the web server for a page of the web site 34. In response, the web server returns the requested page 42 to the user 38. Historical data characterizing the user's interactions with the web site, including user selections of user-selectable contents on the one or more web pages, are collected and analyzed using analytical methods (e.g., the methods provided by Google® analytics software). This data may be collected and analyzed by the web server or by another server. The results 39 of the analysis of the relevant historical data typically are transmitted to the content prioritization system 30 for use in determining the prioritization ordering of the user-selectable contents 34.

The web server typically refreshes the web page 42 on a regular cycle (e.g., every five minutes). In some embodiments, the content prioritization system 30 determines a prioritization order of the selected user-selectable contents during each refresh period. On each web page, the variable content slots typically are prioritized by the likely amounts of attention that user-selectable contents are expected to receive from users when they are placed in those slots. In some embodiments, the variable content slots are prioritized by their respective positions on the web page. For example, a user-selectable content in a variable content slot at the top of a web page typically draws more attention than a similar user-selectable content. If the prioritization ordering of the contents changes, the user-selectable contents in the variable content slots of the web page are changed as needed in the following refresh of the page to reflect the changed prioritization order.

Figure 3:
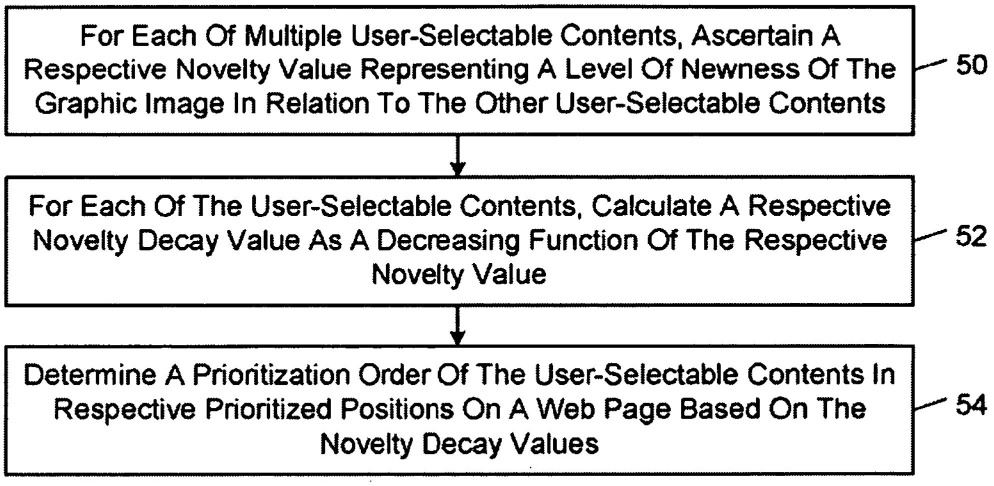
FIG. 3 is a flow diagram of an embodiment of a method of populating variable content slots on a web page with user-selectable content.

FIG. 3 shows an embodiment of a method by which the content prioritization system 30 populates variable content slots on a web page of the web site 32 with the selected user-selectable contents 34. In accordance with the method of FIG. 3, the content prioritization system 30 ascertains for each of the user-selectable contents a respective novelty value representing a level of newness of the graphic image in relation to the other user-selectable contents (FIG. 3, block 50). The content prioritization system 30 calculates for each of the user-selectable contents a respective novelty decay value as a decreasing function of the respective novelty value (FIG. 3, block 52). The content prioritization system 30 determines a prioritization order of the user-selectable contents in respective prioritized positions on the web page based on the novelty decay values (FIG. 3, block 54).

The elements of the method of FIG. 3 are described detail below in the following section.

IV. Populating Variable Content Slots on Web Pages

A. Ascertaining Novelty Values and Popularity Values

The content prioritization system 30 ascertains for each of the user-selectable contents a respective novelty value representing a level of newness of the graphic image in relation to the other user-selectable contents (FIG. 3, block 50). In some embodiments, the process of ascertaining the respective novelty values involves, ascertaining respective age of the user-selectable contents on the page and determining the respective novelty values based on the respective ages. In some of these embodiments, the content prioritization system 30 sets the respective novelty values equal to the respective ages of the user-selectable contents.

In some embodiments, the content prioritization system 30 additionally ascertains a respective popularity value for each of the user-selectable contents. Each of the popularity values represents a level of popularity of the user-selectable contents in relation to the other user-selectable contents. The process of ascertaining the respective popularity values typically is based on respective counts of user selections of the link associated with the user-selectable content. For example, in the illustrated embodiments, the popularity values are given by the total numbers of clicks ($N_t$) generated from the respective user-selectable contents in each period t B. Calculating Novelty Decay Values 1. Introduction The content prioritization system 30 calculates for each of the user-selectable contents a respective novelty decay value as a decreasing function of the respective novelty value (FIG. 3, block 52).

In some embodiments, the content prioritization system 30 calculates the respective novelty decay values by calculating each of the respective novelty decay values as a decreasing exponential function of the respective novelty value. In some of these embodiments, this process involves, for each of the user-selectable contents (j) calculating the respective novelty decay value ($r_j(t_j)$) in accordance with equation (1):

$$r_j(t_j)=a\cdot e^{-d(tj)} \tag{1}$$

where $t_j$ is the respective novelty value, $d(t_j)=\alpha(t_j)^a$, a is a weighting factor, and α and β are parameters that have respective values. In some embodiments, the values of the parameters α and β are determined based on a statistical evaluation of historical data characterizing user selections of user-selectable contents on the web page.

2. Location Matters

The location of a link in a page determines the overall number of clicks in a given time interval. In particular, the order in which user-selectable contents are placed within a web page (e.g. the news stories of digg.com) determines the number of clicks within a certain time frame. Assume that time flows discretely as t=1, 2, . . . minutes. Let $N_t$ denote the number of clicks (or, for example, the digg number of a story in digg.com) that appeared on the website t minutes ago (in this case we say that the story has lifetime t). The growth of $N_t$ satisfies the following stochastic equation:

$$N_{t+1}=N_t(1+ar_tX_t), \tag{2}$$

where $r_t$ is a novelty factor that decays with time and satisfies $r_o=1$, $X_t$ is a random variable with mean 1, and a is a positive constant.

This equation takes into account two factors that together influence the growth of collective attention: popularity and novelty. The popularity effect is captured by the multiplicative form of equation (2), and the novelty effect is described by $r_t$. All other factors are contained in the noise term $X_t$.

In addition to popularity and novelty, there also is a third position factor. A user-selectable content displayed at a top position on the front page easily draws more attention than a similar user-selectable content placed on later pages. Hence the growth decay $ar_t$ should depend on the physical position at which the user-selectable content is presented.

In the specific case of digg.com, its front page is divided into 15 slots, being able to display 15 stories at a time. The user-selectable contents are always sorted chronologically, with the latest user-selectable content at the top. If the positions are labeled from top to bottom by i=i, 2, . . . , 15, we can modify equation (2) to allow for an explicit dependency of a on i:

$$N_{t+1}=N_t(1+a_ir_tX_t), \tag{3}$$

where $a_i$ is a position factor that decreases with i.

The assumption that the novelty effect and the position effect can be separated into two factors $r_t$ and $a_i$ was tested empirically. To this end the growth rate was tracked for each slot, rather than for each story. For multiplicative models it is convenient to define the logarithmic growth rate $$s_t=\log N_{t+1}-\log N_t. \tag{4}$$

When a is small (which is always true for short time periods) we have from Equation (3)

$$s_t^i\approx a_ir_tX_t \tag{5}$$

for a story placed at position i at time t. Taking the expected value of both sides, we have $$Es_t^i\approx a_ir_t, \tag{6}$$

since $EX_t=1$.

The logarithmic growth rate $s_t^i$ can be measured as follows. For each fixed position i, if a digg story appears on that position at both times t and t+5 (the front page is refreshed every 5 minutes), then the observed quantity $$\frac{1}{5}(\log N_{t+5}-\log N_t)$$

counts as one sample point of $s_t^i$.

Figure 4A:
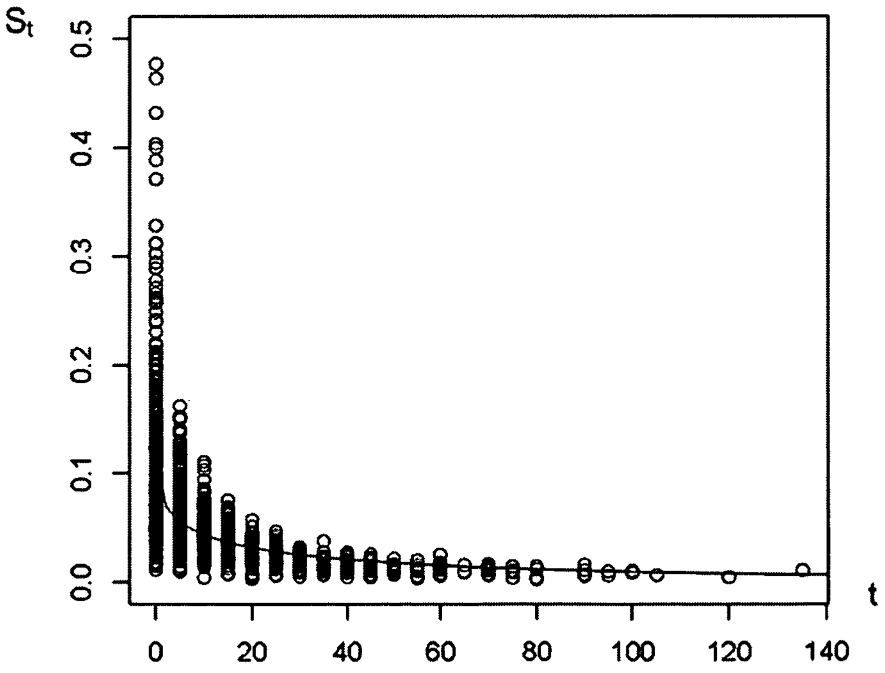
FIGS. 4A and 4B are charts of sample points of logarithmic growth rates plotted for different variable content slots on a web page at different times.
Figure 4B:
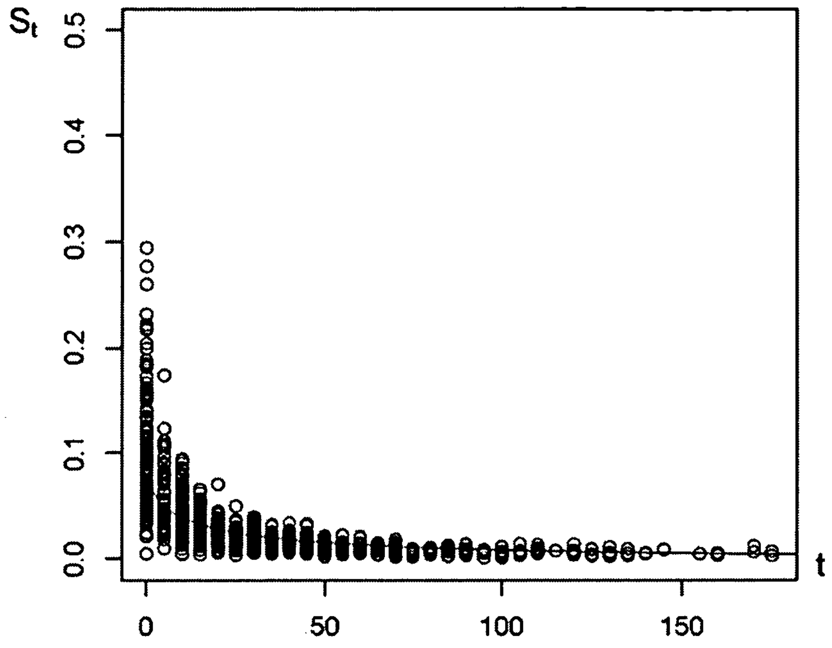

FIGS. 4A and 4B are charts of sample points of the logarithmic growth rates plotted for different variable content slots on a web page at different times. In particular, FIG. 4A plots 1,220 sample points collected from the top position on the front page of digg.com at various times, and FIG. 4B is a similar plot for the second top position. By comparing FIGS. 4A and 4B we see that $s_t^2$ indeed tends to fall below $s_t^1$, which indicates that the position effect is real. In FIGS. 4A and 4B, time is measured in minutes. Data is collected every 5 minutes, which is the rate at which the front page is refreshed. The solid curve in FIG. 4A is the result of a minimum mean square fit to the data, which has the functional form $f(t)=0.120e^{-0.41^{0.4}}$. The curve in FIG. 4B has the functional form $f(t)=0.106e^{-0.41^{0.4}}$.

Figure 5:
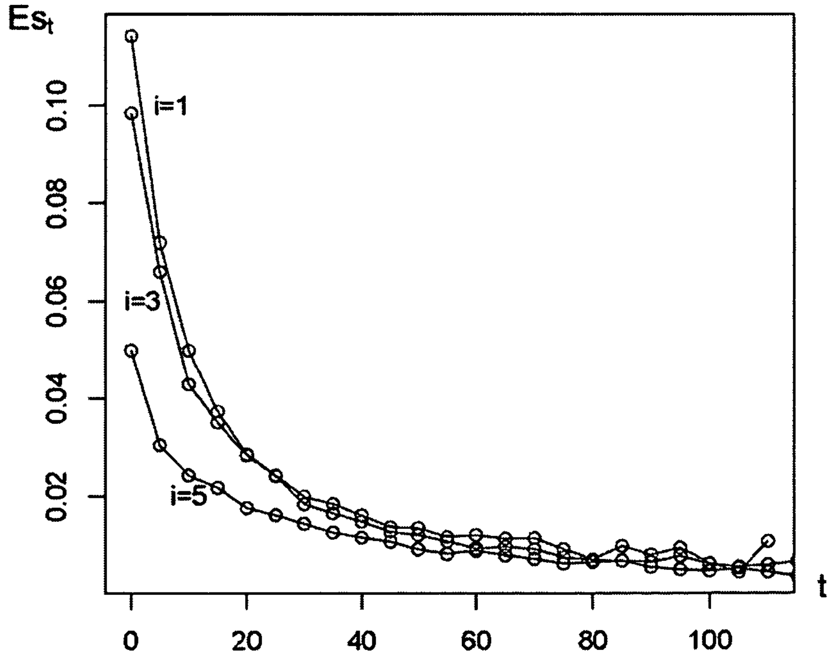
FIG. 5 is a chart of the expected logarithmic growth rate for different variable content slots (i) on a web page.

FIG. 5 is a chart of the expected logarithmic growth rate for different variable content slots (i) on a web page. In particular, FIG. 5 shows the expected logarithmic growth rate for position 1, 3 and 5 on the front page of digg.com. Time is measured in minutes. As can be seen, the growth rate decays as the story moves to lower positions (higher i values).

From the historical data shown in FIGS. 4A-5, the values of $a_i$ are determined quantitatively. For example, in the case of digg.com, the functional form of the decay factor is $r_t=e^{-0.41^{0.4}}$. Thus, for these particular values of α and β, the minimum mean square estimator $\hat{a}^i$ minimizes $$\min_{a^i}\sum_j\left[s^i_{t_j}(j)-a^i r_{t_j}\right]^2=\min_{a^i}\sum_j\left[s^i_{t_j}(j)-a^i e^{-0.4t_j^{0.4}}\right]^2, \tag{7}$$

where $t_j$ is the lifetime of the j'th data point. The estimator for the 1,220 data points obtained from the top position is calculated to be $\hat{a}^1=0.120$. The fitted curve $$\hat{a}^1 r_t=0.120e^{-0.4t_j^{0.4}}$$

is shown as a solid curve in FIG. 4A. An estimator $\hat{a}^2=0.106$ for the second top position is also calculated and plotted in FIG. 4B. As can be seen from FIGS. 4A and 4B, the position effect ($a^i$) and the novelty effect ($r_t$) can indeed be separated and therefore Equation (3) fits the data very well.

C. Determining a Prioritization Order of the User-Selectable Contents

The content prioritization system 30 determines a prioritization order of the user-selectable contents in respective prioritized positions on the web page based on the novelty decay values (FIG. 3, block 54).

Some embodiments are modeled in an infinite-horizon framework in which future clicks are discounted with a discount parameter δ, so that one click at time t counts as δ' click at time 0. In these embodiments, the objective is to maximize $$\sum_{t=0}^{\infty}\delta^t N_t,$$

where $N_t$ is the total number of clicks generated from the user-selectable contents on the web page in period t.

Other embodiments are modeled with the finite-horizon objective. In these embodiments, the variable content slots of a web page are populated with user-selectable contents in a way that generates the largest number of clicks within a certain finite time period T. Some of these embodiments employ ordering strategies called indexing strategies, which are defined as follows. Given a state of a user-selectable content (which in the illustrated embodiments is a two-vector ($N_t$, t)) an index O is calculated for each user-selectable content using a predefined index function O($N_t$, t), and then sorts the user-selectable contents based on their respective indices. In some embodiments, the slots on the web page are populated in descending order, with the user-selectable content with the largest index displayed at the top, the user-selectable content with the second largest index displayed next, and so on.

Figure 6:
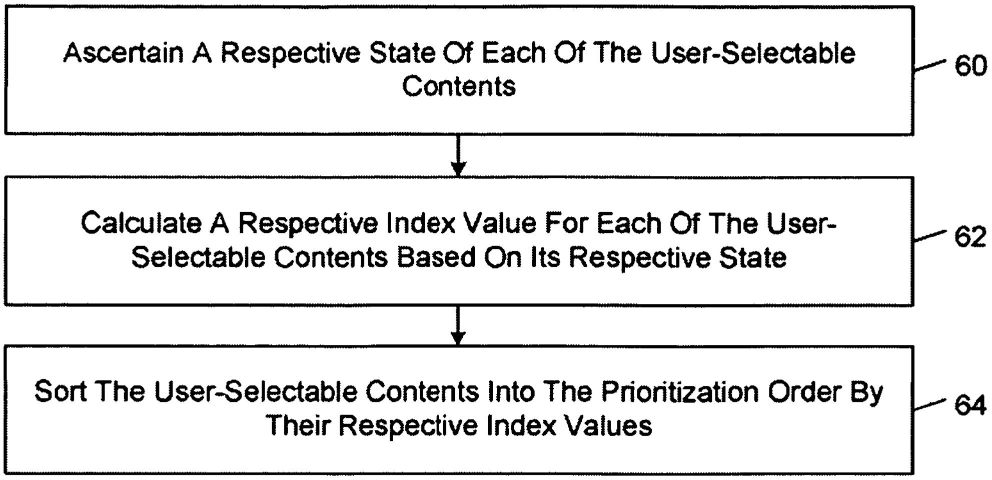
FIG. 6 is a flow diagram of an embodiment of a method of determining a prioritization order for populating variable content slots on a web page with user-selectable content.

FIG. 6 shows an embodiment of a method of determining a prioritization order for populating variable content slots on a web page with user-selectable content. In this embodiment, the process of determining the prioritization order involves computing a respective index value for each of the user-selectable contents, and sorting the user-selectable contents into the prioritization order by their respective index values. In particular, the content prioritization system 30 ascertains a respective state of each of the user-selectable contents (FIG. 6, block 60). The content prioritization system 30 calculates a respective index value for each of the user-selectable contents based on its respective state (FIG. 6, block 62). The content prioritization system 30 sorts the user-selectable contents into the prioritization order by their respective index values (FIG. 6, block 64).

Some of these embodiments employ an indexing strategy that prioritizes user-selectable contents that are predicted to receive the most attention in the next time period in accordance with equation (8):

$$O_1(t)=N_1 r_t. \tag{8}$$

In these embodiments, the process of determining the prioritization order for each of the user-selectable contents involves determining the respective index value from a respective multiplication together of the respective popularity value ($N_t$) and the respective novelty decay value ($r_t$). This is a "one-step-greedy" strategy. Ignoring the position effect (i.e., assume a=1), a user-selectable content in state ($N_t$, t) generates on average $N_t r_t$ more clicks (or "diggs" in the case of the digg.com web site) in the next period. This strategy thus places the most "replicated" story at the top of a web page.

Figure 7:
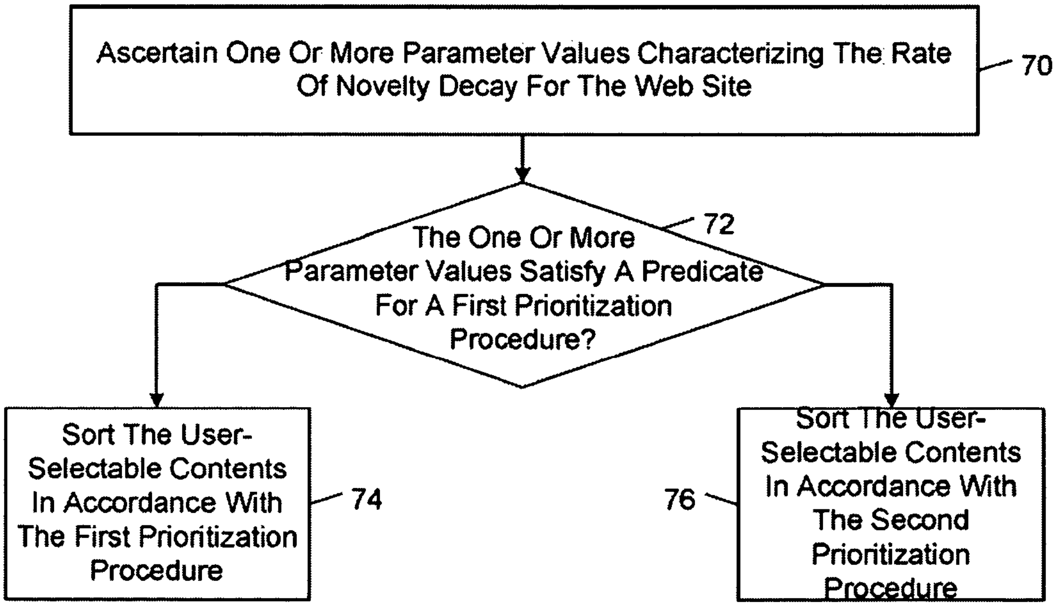
FIG. 7 is a flow diagram of an embodiment of a method of determining a prioritization order for populating variable content slots on a web page with user-selectable content.

FIG. 7 shows another embodiment of a method of determining a prioritization order for populating variable content slots on a web page with user-selectable content.

In accordance with the method of FIG. 7, the content prioritization system 30 additionally ascertains one or more parameter values that characterize the rate of novelty decay for the web site (FIG. 7, block 70). These parameter values typically are ascertained from a statistical evaluation of historical data characterizing user selections of user-selectable contents on the web site.

In this embodiment, the process of determining the prioritization order involves selecting one of multiple different prioritization procedures based on the one or more ascertained parameter values and determining the prioritization order in accordance with the selected prioritization strategy. In particular, if the one or more parameter values satisfy a predicate for a first prioritization procedure (FIG. 7, block 72), the content prioritization system 30 sorts the user-selectable contents in accordance with a first prioritization procedure (FIG. 7, block 74). Otherwise, the content prioritization system 30 sorts the user-selectable contents in accordance with the second prioritization procedure (FIG. 7, block 76).

In some embodiments, the selection process involves selecting between (i) a first prioritization procedure that assigns ones of the user-selectable contents determined to be higher in novelty to higher priority ones of the locations on the web page than ones of the user-selectable contents determined to be lower in novelty and (ii) a second priotization procedure that assigns ones of the user-selectable contents determined to be higher in popularity to higher priority ones of the locations on the web page than ones of the user-selectable contents determined to be lower in popularity.

In some of these embodiments, the first prioritization procedure involves sorting the user-selectable contents by their novelty, with the newest user-selectable contents at the top, in accordance with equation (9):

$$O_2(t)=-t \tag{9}$$

The second prioritization procedure involves sorting the user-selectable contents by their popularity, with the most popular user-selectable contents at the top, in accordance with equation (10):

$$O_3(t)=N_t \tag{10}$$

Notice that because $N_t$ grows with time, the effect of sorting by $O_2$ is almost the opposite of sorting according to $O_3$.

A rough estimate of the performance of the prioritization strategies $O_2$ and $O_3$ can be obtained as follows. For the sake of generality, assume that there are m positions on the front page. New stories arrive at a rate $\lambda>0$. Novelty decays as $r_t=e^{-\omega t^\beta}$, where $0<\beta\leq 1$. Let $$\bar{a}=\frac{1}{m}\sum a_i$$

be the average position factor, which equals 0.08 for digg.com. Let $\Delta t$ be the refresh time step, which is five minutes for digg.com.

Consider strategy $O_3$ first. According to the index rule, new user-selectable contents never appear on the front page. In the case of dig.com, all diggs are generated by the initial m stories. After time T we have from equation (4) that $$\log N_T=\sum_{t=0,\Delta t,\ldots,T-\Delta t} a_i r_t X_t \Delta t. \tag{11}$$

Hence, on average each story's log-performance is $$E\log N_T=\sum_{t=0,\Delta t,\ldots,T-\Delta t} \bar{a} r_t \Delta t \approx \bar{a}\int_0^T r_t\,dt. \tag{12}$$

When T is large, we have $$E\log N_T \approx E\log N_\infty = \bar{a}\int_0^\infty r_t\,dt. \tag{13}$$

Next consider $O_2$, which orders the user-selectable contents by their respective lifetimes (t). On average every $s=1/\lambda$ minutes a new user-selectable content replaces an old user-selectable content, and each old story moves down one position on the web page. Hence, on average each user-selectable content stays on the front page for ms minutes, where m is the number of positions. The quantity ms is referred to as one page cycle, which is the average time it takes to refresh the whole page. Before a story disappears from the front page, it generates $$N_{ms}=\exp\left(\sum_{t=0,\Delta t,\ldots,ms-\Delta t} a_{i(t)} r_t X_t \Delta t\right) \tag{14}$$

clicks, where i(t) is the position of the user-selectable content at time t. When a user-selectable content gets replaced by a new user-selectable content, they are counted as one user-selectable content restarting from the state $N_t=1$ and t=0. The multiplicative process starts over, and another $N_{ms}$ clicks are generated in the next ms minutes, on average. Thus, in a total time period T the process is repeated T/(ms) times, and a total number of $N_{ms}$T/(ms) clicks are generated per user-selectable content. The log-performance of $O_2$ is approximately $$\log N_{ms}+\log\left(\frac{T}{\mathrm{ms}}\right)=\sum_{t=0,\Delta t,\ldots,ms-\Delta t} \bar{a} r_t X_t \Delta t+\log\left(\frac{T}{\mathrm{ms}}\right), \tag{15}$$

where $a_i(t)$ is replaced by $\bar{a}$ since on average each user-selectable content stays in position 1, . . . , m for equal times. Taking the expected value of both sides, yields:

$$E\log N_{ms}+\log\left(\frac{T}{\mathrm{ms}}\right)\approx \bar{a}\int_0^{ms} r_t\,dt+\log\left(\frac{T}{\mathrm{ms}}\right). \tag{16}$$

The critical point can be determined by equating Equation (12) and (15):

$$E\log N_T - E\log N_{ms} = \log T - \log(\mathrm{ms}), \tag{17}$$

or $$\bar{a}\int_{ms}^\infty r_t\,dt = \log\left(\frac{T}{\mathrm{ms}}\right), \tag{18}$$

which holds for any functional form of $r_t$. The left side of equation (17) can be interpreted as the total novelty left after a time ms, or the total log-performance that can be gained from one user-selectable content after one page cycle. The right hand side of equation (17) is the total log-time left after one page cycle. Thus, equations (17) and (19) say that, after one page cycle, if there is more novelty left than the log-time remained, the user-selectable contents should be ordered by decreasing popularity rather than by decreasing novelty ($O_3$ is better than $O_2$). Conversely, if novelty decays too fast (not enough novelty left after one page cycle), then the user-selectable contents should be ordered by decreasing novelty rather than decreasing popularity ($O_2$ is better than $O_3$).

When $r_t=e^{-\omega t^\beta}$ it holds that $$\int_{ms}^\infty r_t\,dt = \frac{\alpha^{-\frac{1}{\beta}}}{\beta}\Gamma\left(\frac{1}{\beta}, \alpha(\mathrm{ms})^\beta\right), \tag{19}$$

where $$\Gamma(a, x) = \int_x^\infty t^{a-1} e^{-1}\,dt \tag{20}$$

is the incomplete Gamma function. In this case the critical equation can also be written as $$\bar{a}\frac{\alpha^{-\frac{1}{\beta}}}{\beta}\Gamma\left(\frac{1}{\beta}, \alpha(\mathrm{ms})^\beta\right) = \log\left(\frac{T}{\mathrm{ms}}\right). \tag{21}$$

For the parameters of digg.com ($\bar{a}$=0.08, m=15, s=20) and horizon T=50,000 one can solve for the critical curve $(\alpha,\beta)$ on which $O_2$ and $O_3$ have the same performance.

Figure 8:
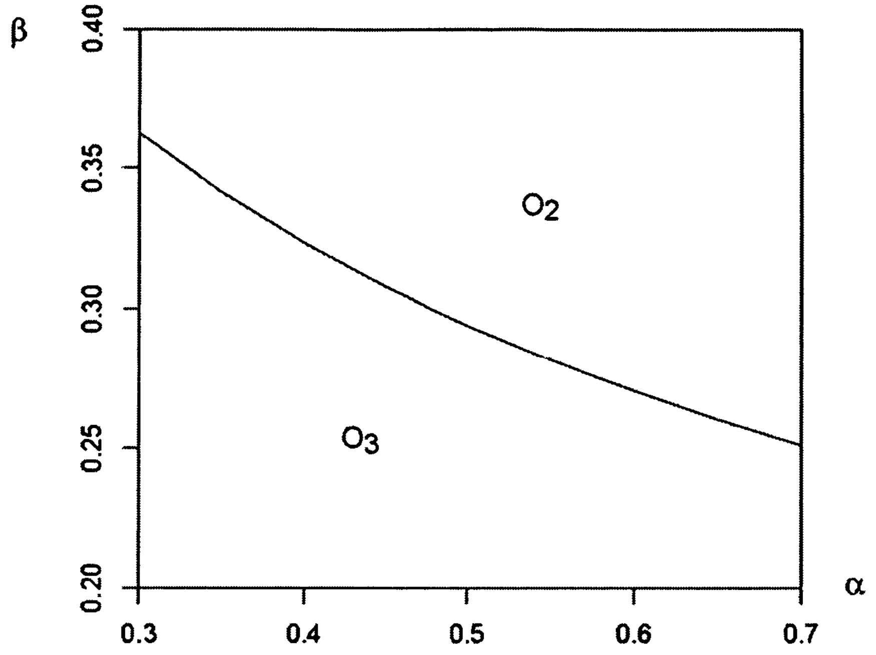
FIG. 8 is a chart showing a transition between first and second prioritization procedures as a function of two parameter values characterizing the rate of novelty decay for a web site.

FIG. 8 is a chart showing a "phase" transition between first and second prioritization procedures as a function of two parameter values ($\alpha,\beta$) characterizing the rate of novelty decay for a web site. When the parameters ($\alpha,\beta$) lie above the critical curve, the user-selectable contents should be sorted by $O_2$. Otherwise they should be sorted by $O_3$.

A simulated was built to test the prioritization strategies $O_1$, $O_2$, and $O_3$. The simulator closely resembles the functioning of digg.com in that it incorporates the following rules:

1. Initially there are 15 stories, all in state $(N_t,t)=(1,0)$. In words, each story starts with 1 digg and lifetime 0. (Because the model is purely multiplicative, the initial digg number does not matter. It is set to be 1.)
2. Allocate the 15 stories to 15 positions, in decreasing order of their $O(N_t, t)$, for any given index function O.
3. Time evolves one step (5 minutes) at a time. The number of diggs generated from a story at position i is given by $$\Delta N_{t+5}=N_{t+5}-N_t=5a_i r_t X_t N_1. \tag{22}$$

The total number of diggs generated in this time step is the sum of 15 such numbers.

The values of $a_i$ were estimated from real data and shown in FIG. 5. $r_t=e^{-0.41^{0.4}}$. $X_t$ is randomly drawn from a normal distribution with mean 1 and standard deviation 0.5 (obtained from the real data from digg.com).
4. On average every 20 minutes a new story arrives. Thus the number of stories arriving in one time step (5 minutes) follows a Poisson distribution with mean 0.25. When a new story enters the pool, the story with the lowest index is dropped, maintaining 15 stories in total. (It is possible the a new story is dropped immediately after its arrival if it happens to have the lowest index.)
5. Go back to Step 2 until the loop has been repeated for enough rounds.

The performance of all three index functions $O_1$, $O_2$, and $O_3$ were tested in the simulator. For each index function, Steps 2 to 5 were repeated 100,000 times (or equivalently 500,000 minutes). Strategy $O_2$ (sort by novelty) achieved a total number of 514,314.8 diggs. Strategy $O_3$ (sort by popularity) only generated 354.6 diggs. Strategy $O_1$ (one-step-greedy) generated 452,402.3 diggs. Thus for these parameter values $O_2$ turns out to be best strategy, since it is 13.7% better than $O_1$ and tremendously better than $O_3$.

The reason for the relatively poor performance of the index $O_3$ is easy to understand. Strategy $O_3$ gives higher priority to stories that have been dugg many times. According to the indexing rule, after one period new stories can never find their way to the front page since all the old stories have more than 1 digg! When novelty decays fast, the old stories remaining on the front page soon lose their freshness and cease to generate any new diggs. The system thus gets frozen in an unfruitful state.

The fact that $O_2$ outperforms $O_1$ is a bit harder to understand. Some intuition can be gained by considering an extreme case. Suppose each user-selectable content completely loses its novelty after one second ($r_o=1$, $r_t=0$ for all $t>0$). Then only "new arrivals" should be displayed since they are the only ones that can generate new diggs. Sorting stories by their lifetime is a good idea when novelty decays fast. On the other hand, if novelty never decays ($r_t=1$), the lifetime factor becomes irrelevant. Thus in this case, strategy $O_1$, which prioritizes popular stories, will win over $O_2$. Hence, the fact that $O_2$ works better than $O_1$ in the simulations shows that novelty decays relatively fast for digg.com. Should it decay at a slower rate, $O_1$ would be a better choice.

Note that the simulation only showed that the ordering implied by $O_2$ works better than $O_1$ for a particular choice of T. In general this may not be true for other values of T. In fact, for a time interval of T=5 minutes (one time step) $O_1$ is by definition the best strategy. Hence, comparing the performance of two or more index functions only makes sense after one has specified a time horizon (or how much the future should be discounted if an infinite horizon is assumed).

Figure 9:
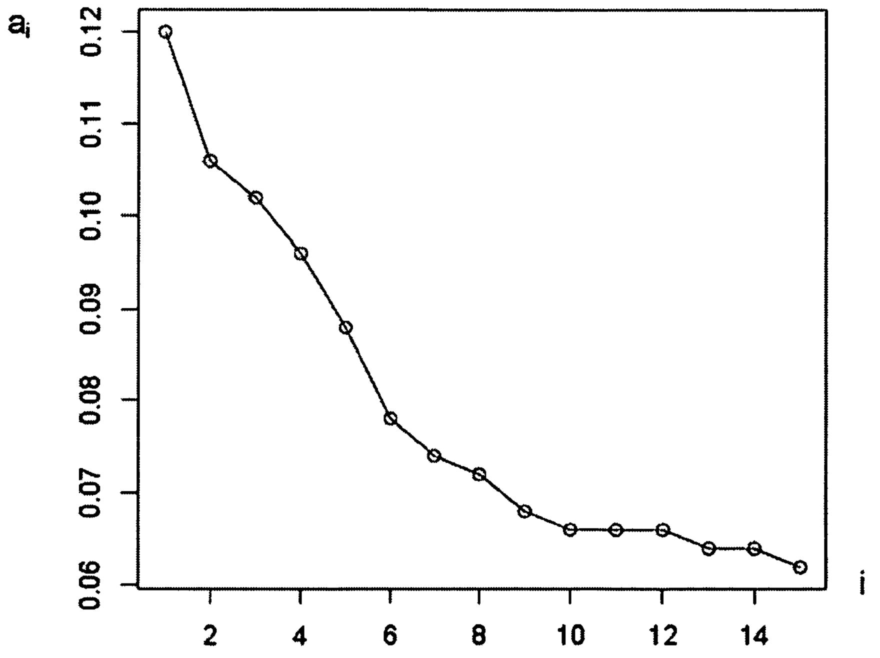
FIG. 9 is a chart of a position factor ($a_i$) plotted as a function of position (i) on a web page.

In order to quantitatively test the limiting behavior of the three indexing strategies, the simulations were repeated for a range of different values of the decay parameter $r_t$. In the illustrated embodiments, the decay parameter $r_t$ is modeled by a function that decays as a stretched exponential function, whose general form can be written as $r_t=e^{-\omega^{\beta}}$. For digg.com, it turns out that $\alpha=\beta=0.4$. The parameter $\beta$ determines the decay rate. For fixed $\alpha$, the larger $\beta$, the faster $r_t$ decays. The experiment was repeated for $\alpha=0.4$ and $\beta\in[0.30,0.45]$. The result is shown in FIG. 9, which is a chart of a position factor ($a_i$) plotted as a function of position (i) on a web page.

The performance of each indexing strategy is measured by the logarithm of the total number of diggs generated in 10,000 rounds. As $\beta$ increases (faster decay), the number of diggs decreases for all three indexing strategies. When $\beta>0.34$, $O_2$ performs slightly better than $O_1$ and much better than $O_3$. When $\beta<0.33$, however, $O_1$ and $O_3$ perform significantly better than $O_2$. In other words, on the two sides of the value of $\beta=0.335$, the stories should be displayed in completely reversed order. This phenomenon is referred to as a phase transition that takes place at the value of $\beta=0.335$ (see FIG. 8).

Figure 10:
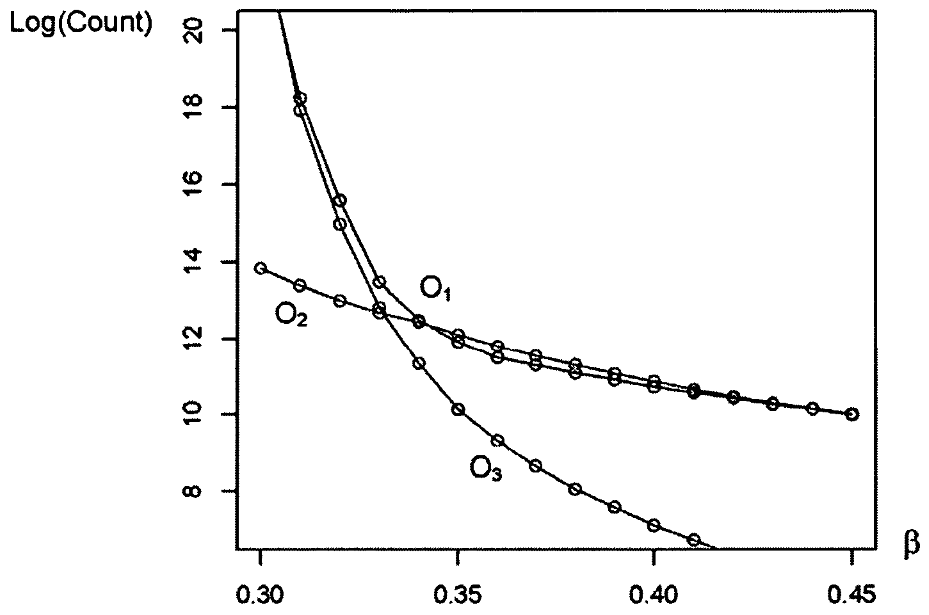
FIG. 10 is a chart of the number of page clicks generated from a web page on which variable content slots are populated with user-selectable contents in accordance with three different prioritization procedures.

FIG. 10 is a chart of the number of page clicks generated from a web page on which variable content slots are populated with user-selectable contents in accordance with three different procedures. In FIG. 10, $O_1$ asymptotically approaches $O_2$ and $O_3$ both in the fast and slow decay limits, and that in general $O_1$ is the best index among the three strategies (although for the specific parameters of digg.com ($\alpha=\beta=0.4$) and our particular time horizon $O_2$ is slightly better). This is because $O_1$ trades off between popularity and novelty instead of betting on only one factor. To see this, consider the equivalent index function $$O_{1'}(N_t,t)=\log O_3(N_t,t)=\log N_t+\log r_t. \tag{23}$$

Clearly, $O_{1'}$ linearly trades off between log $N_t$ and log $r_t$, assigning identical weight to the two effects. This is by no means the best tradeoff. For example, the index function $$O_4(N_t,t)=0.6\log N_t+\log r_t \tag{24}$$

achieves 556,444.1 diggs after 100,000 rounds of simulation, which is 8.2% more than $O_2$ and 23.0% more than $O_1$.

V. Exemplary Operating Environments

In general, the content prioritization system 30 typically includes one or more discrete data processing components, each of which may be in the form of any one of various commercially available data processing chips. In some implementations, the content prioritization system 30 is embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In some embodiments, the content prioritization system 30 executes process instructions (e.g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Embodiments of the content prioritization system 30 may be implemented by one or more discrete modules (or data processing components) that are not limited to any particular hardware or software configuration, but rather it may be implemented in any computing or processing environment, including in digital electronic circuitry or in computer hardware, firmware, device driver, or software. In some embodiments, the functionalities of the modules are combined into a single data processing component. In some embodiments, the respective functionalities of each of one or more of the modules are performed by a respective set of multiple data processing components. The various modules of the content prioritization system 30 may be co-located on a single apparatus or they may be distributed across multiple apparatus; if distributed across multiple apparatus, the modules may communicate with each other over local wired or wireless connections, or they may communicate over global network connections (e.g., communications over the internet).

Figure 11:
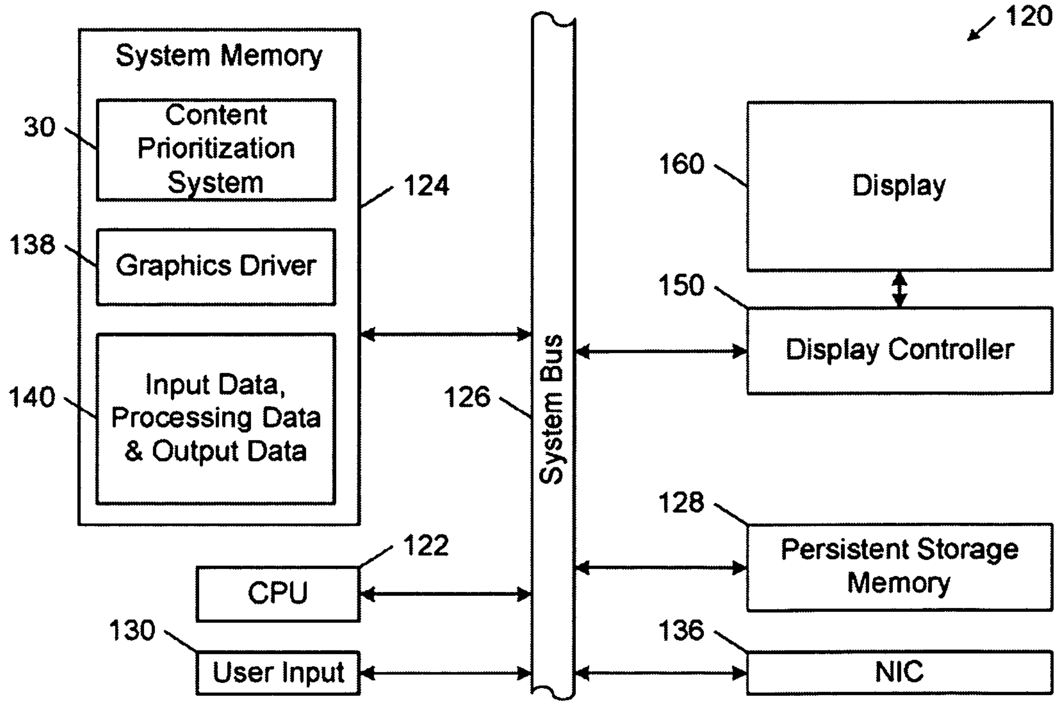
FIG. 11 is a block diagram of a computer system that incorporates an element of the content prioritization system of FIG. 2.

FIG. 11 shows an embodiment of a computer system 120 that can implement any of the embodiments of the content prioritization system 30 that are described herein. The computer system 120 includes a processing unit 122 (CPU), a system memory 124, and a system bus 126 that couples processing unit 122 to the various components of the computer system 120. The processing unit 122 typically includes one or more processors, each of which may be in the form of any one of various commercially available processors. The system memory 124 typically includes a read only memory (ROM) that stores a basic input/output system (BIOS) that contains start-up routines for the computer system 120 and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A user may interact (e.g., enter commands or data) with the computer 120 using one or more input devices 130 (e.g., a keyboard, a computer mouse, a microphone, joystick, and touch pad). Information may be presented through a user interface that is displayed to the user on a display monitor 160, which is controlled by a display controller 150 (implemented by, e.g., a video graphics card). The computer system 120 also typically includes peripheral output devices, such as speakers and a printer. One or more remote computers may be connected to the computer system 120 through a network interface card (NIC) 136.

As shown in FIG. 11, the system memory 124 also stores the content prioritization system 30, a graphics driver 138, and processing information 140 that includes input data, processing data, and output data. In some embodiments, the image processing system 14 interfaces with the graphics driver 138 (e.g., via a DirectX® component of a Microsoft Windows® operating system) to present a user interface on the display monitor 160 for managing and controlling the operation of the content prioritization system 30.

VI. Conclusion

The embodiments that are described herein provide methods and apparatus for populating variable content slots on web pages with user-selectable contents (e.g., advertisements, topic tiles, and other variable contents) in a way that increases the attention that is drawn to the web page. These embodiments provide a principled way of prioritizing user-selectable contents when designing dynamic websites. In some embodiments, the rates with which novelty and popularity evolve within the website are translated into a prioritization ordering of the user-selectable contents. Some embodiments, are designed to guarantee a maximal level of attention (e.g., a maximum number of clicks per interval of time) when deciding between strategies (or procedures) for ordering user-selectable contents on a web page.

Other embodiments are within the scope of the claims.

The invention claimed is:

1. A method, comprising a processor performing operations comprising:

for each of multiple user-selectable contents,
- ascertaining a respective novelty value representing a level of newness of the user-selectable content in relation to the other user-selectable contents, and
- calculating a respective novelty decay value as a decreasing function of the respective novelty value; and determining a prioritization order of the user-selectable contents in respective prioritized positions on a web page based on the novelty decay values.

2. The method of claim 1, wherein the ascertaining comprises for each of the user-selectable contents ascertaining a respective age of the user-selectable content on the page and determining the respective novelty value based on the respective age.

3. The method of claim 2, wherein the ascertaining comprises for each of the user-selectable contents setting the respective novelty value equal to the respective age.

4. The method of claim 1, wherein the calculating comprises for each of the user-selectable contents calculating the respective novelty decay value as a decreasing exponential function of the respective novelty value.

5. The method of claim 4, wherein the calculating comprises for each of the user-selectable contents (i) calculating the respective novelty decay value ($r_i(t_i)$) in accordance with:

$$r_i(t_i)=a\cdot e^{-d(t_i)}$$

wherein $t_i$ is the respective novelty value, $d(t_i)=\alpha(t_i)^{\beta}$, a is a weighting factor, and ∩ and Ʊ are parameters that have respective values.

6. The method of claim 5, further comprising determining the values of the parameters ∩ and Ʊ based on a statistical evaluation of historical data characterizing user selections of user-selectable contents on the web page.

7. The method of claim 1, wherein the determining comprises computing a respective index value for each of the user-selectable contents, and sorting the user-selectable contents into the prioritization order by their respective index values.

8. The method of claim 1, further comprising for each of the user-selectable contents ascertaining a respective popularity value representing a level of popularity of the user-selectable contents in relation to the other user-selectable contents.

9. The method of claim 8, wherein for each of the user-selectable contents the ascertaining of the respective popularity value is based on a respective count of user selections of the user-selectable content.

10. The method of claim 8, wherein the determining comprises for each of the user-selectable contents determining the respective index value from a respective multiplication together of the respective popularity value and the respective novelty decay value.

11. The method of claim 1, further comprising ascertaining one or more parameter values characterizing the decreasing function of the novelty values from a statistical evaluation of historical data characterizing user selections of user-selectable contents on the web page, and wherein the determining comprises selecting one of multiple different prioritization procedures based on the one or more ascertained parameter values and determining the prioritization order in accordance with the selected prioritization strategy.

12. The method of claim 11, wherein the selecting comprises selecting between (i) a first prioritization procedure that assigns ones of the user-selectable contents determined to be higher in novelty to higher priority ones of the locations on the web page than ones of the user-selectable contents determined to be lower in novelty and (ii) a second prioritization procedure that assigns ones of the user-selectable contents determined to be higher in popularity to higher priority ones of the locations on the web page than ones of the user-selectable contents determined to be lower in popularity.

13. At least one non-transitory computer-readable medium comprising computer-readable program code that, when executed by a computer, causes the computer to perform operations comprising:

for each of multiple user-selectable contents, ascertaining a respective novelty value representing a level of newness of the user-selectable content in relation to the other user-selectable contents, and calculating a respective novelty decay value as a decreasing function of the respective novelty value; and determining a prioritization order of the user-selectable contents in respective prioritized positions on a web page based on the novelty decay values.

14. The at least one computer-readable medium of claim 13, wherein in the calculating the program code causes the computer to perform operations comprising for each of the user-selectable contents (i) calculating the respective novelty decay value ($r_i(t_i)$) in accordance with:

$$r_i(t_i)=a\cdot e^{-d(ti)}$$

wherein $t_i$ is the respective novelty value, $d(t_i)=\alpha(t_i)^\beta$, a is a weighting factor, and ∩ and ℧ are parameters that have respective values.

15. The at least one computer-readable medium of claim 13, wherein:

the program code causes the computer to perform operations further comprising for each of the user-selectable contents ascertaining a respective popularity value representing a level of popularity of the user-selectable contents in relation to the other user-selectable contents;

in the ascertaining the program code causes the computer to perform operations comprising for each of the user-selectable contents ascertaining the respective popularity value based on a respective count of user selections of the user-selectable content; and in the determining the program code causes the computer to perform operations comprising for each of the user-selectable contents determining the respective index value from a respective multiplication together of the respective popularity value and the respective novelty decay value.

16. The at least one computer-readable medium of claim 13, wherein:

the program code causes the computer to perform operations further comprising ascertaining one or more parameter values characterizing the decreasing function of the novelty values from a statistical evaluation of historical data characterizing user selections of user-selectable contents on the web page;

in the determining the program code causes the computer to perform operations comprising selecting one of multiple different prioritization procedures based on the one or more ascertained parameter values and determining the prioritization order in accordance with the selected prioritization strategy; and in the selecting the program code causes the computer to perform operations comprising selecting between (i) a first prioritization procedure that assigns ones of the user-selectable contents determined to be higher in novelty to higher priority ones of the locations on the web page than ones of the user-selectable contents determined to be lower in novelty and (ii) a second prioritization procedure that assigns ones of the user-selectable contents determined to be higher in popularity to higher priority ones of the locations on the web page than ones of the user-selectable contents determined to be lower in popularity.

17. Apparatus, comprising:

a memory storing computer-readable instructions; and a data processing unit coupled to the memory, operable to execute the instructions, and based at least in part on the execution of the instructions operable to perform operations comprising for each of multiple user-selectable contents, ascertaining a respective novelty value representing a level of newness of the user-selectable content in relation to the other user-selectable contents, and calculating a respective novelty decay value as a decreasing function of the respective novelty value; and determining a prioritization order of the user-selectable contents in respective prioritized positions on a web page based on the novelty decay values.

18. The apparatus of claim 17, wherein in the calculating the data processing unit performs operations comprising for each of the user-selectable contents (i) calculating the respective novelty decay value ($r_i(t_i)$) in accordance with:

$$r_i(t_i)=a\cdot e^{-d(ti)}$$

wherein $t_i$ is the respective novelty value, $d(t_i)=\alpha(t_i)^\beta$, a is a weighting factor, and ∩ and ℧ are parameters that have respective values.

19. The apparatus of claim 17, wherein:

based at least in part on the execution of the instructions the data processing unit is operable to perform operations comprising for each of the user-selectable contents ascertaining a respective popularity value representing a level of popularity of the user-selectable contents in relation to the other user-selectable contents;

in the ascertaining the data processing unit performs operations comprising for each of the user-selectable contents ascertaining the respective popularity value based on a respective count of user selections of the user-selectable content; and in the determining the data processing unit performs operations comprising for each of the user-selectable contents determining the respective index value from a respective multiplication together of the respective popularity value and the respective novelty decay value.

20. The apparatus of claim 17, wherein based at least in part on the execution of the instructions the data processing unit is operable to perform operations comprising ascertaining one or more parameter values characterizing the decreasing function of the novelty values from a statistical evaluation of historical data characterizing user selections of user-selectable contents on the web page;

in the determining the data processing unit performs operations comprising selecting one of multiple different prioritization procedures based on the one or more ascertained parameter values and determining the prioritization order in accordance with the selected prioritization strategy; and in the selecting the data processing unit performs operations comprising selecting between (i) a first prioritization procedure that assigns ones of the user-selectable contents determined to be higher in novelty to higher priority ones of the locations on the web page than ones of the user-selectable contents determined to be lower in novelty and (ii) a second prioritization procedure that assigns ones of the user-selectable contents determined to be higher in popularity to higher priority ones of the locations on the web page than ones of the user-selectable contents determined to be lower in popularity.

* * * * *